United States Patent [19]
Elion

[11] 4,243,297
[45] Jan. 6, 1981

[54] OPTICAL WAVELENGTH DIVISION MULTIPLEXER MIXER-SPLITTER

[75] Inventor: Glenn R. Elion, Natick, Mass.

[73] Assignee: International Communications and Energy, Inc., Natick, Mass.

[21] Appl. No.: 52,895

[22] Filed: Jun. 27, 1979

[51] Int. Cl.³ .............................................. G02B 5/14
[52] U.S. Cl. ............................... 350/96.15; 350/96.22
[58] Field of Search .......................... 350/96.15, 96.22

[56] References Cited
U.S. PATENT DOCUMENTS

| | | | |
|---|---|---|---|
| 4,064,454 | 9/1977 | Pugh | 350/96.22 |
| 4,089,583 | 5/1978 | Auracher et al. | 350/96.15 |
| 4,134,640 | 1/1979 | Auracher et al. | 350/96.15 |

*Primary Examiner*—Harold A. Dixon
*Attorney, Agent, or Firm*—John J. Byrne

[57] ABSTRACT

An optical wavelength division multiplexer mixer-splitter wherein a precision formed substrate chip is fabricated with a first traversing groove and at least a second intersecting groove. A first input/output optical fiber lies upon one end of the first groove and at least a second input/output fiber lies upon the at least a second groove. An output/input optical fiber is aligned upon the other end of the first traversing groove and terminates at a position adjacent the intersection of the first and second grooves upon the substrate chip. The output/input optical fiber is terminated with an angled end face in optical alignment with the first and at least a second input/output optical fibers. The end face is provided with an integral optical coating whereby the unit may serve as a wavelength division mixer, splitter or optical power tap for two or more optical wavelengths.

20 Claims, 5 Drawing Figures

OPTICAL WAVELENGTH DIVISION MULTIPLEXER MIXER-SPLITTER

BACKGROUND OF THE INVENTION

This invention relates to optical fiber communicating networks and links. More specifically, this invention provides an apparatus to couple multiple fiber inputs and outputs to provide selective optical tapping or wavelength division multiplexing.

Optical fiber communications systems have been firmly established as a cost competitive alternative to other types of communications methods for numerous applications in telecommunications, computer networks, and many other areas. To take full advantage of optical transmission requires using the unique properties of optical fibers coupled to various devices particularly to light sources such as semiconductor lasers and light emitting diodes and to optical detectors such as PIN photodiodes and avalanche photodiodes (APD's).

A single optical fiber can be made to carry two or more separate optical signals operating at different wavelengths using independent light sources and detectors at the end devices or terminals. Each optical wavelength pathway can then be multiplexed by other methods such as frequency, space or time division multiplexing, to provide a link or network with a very high bandwidth capacity. All such links or networks using multiplexing of two or more wavelengths require special devices to mix and split the various optical pathways.

The general term wavelength division multiplexing devices applies to those optical components capable of coupling into or splitting out of an optical waveguide or fiber, two or more wavelengths of optical information. The general term is often abbreviated as WDM. Devices which can both couple and split two or more wavelengths into or from an optical beam are called wavelength division multiplexers, mixers and splitters or simply WDM mixer-splitters.

Prior to the subject invention WDM mixer-splitters have been made by various techniques usually requiring graded index lenses, and/or elaborate alignment procedures and equipment, in order to achieve low insertion losses. Additionally at least some prior WDM devices and optical taps used coatings such as partially reflective or dichroic filter coatings external to the optical fiber such as on a thin glass plate or on a beamsplitter prism or cube.

Although such prior systems have achieved a degree of operability and acceptance, such acceptance has not been without reservation. In this connection prior systems have proven to be somewhat large, complicated and expensive. Moreover, prior coating techniques tend to increase cross-talk between channels and further tend to increase insertion loss of the device by adding reflective surfaces.

The difficulties suggested in the preceding are not intended to be exhaustive, but rather are among many which may tend to reduce the effectiveness and user satisfaction of prior WDM mixer-splitter devices. Other noteworthy problems may also exist, however those outlined above should be sufficient to demonstrate that WDM mixer-splitters appearing in the past will admit to worthwhile improvement.

OBJECTS OF THE INVENTION

It is therefore a general object of the invention to provide a novel WDM mixer-splitter which will obviate or minimize difficulties of the type previously described.

It is a specific object of the invention to provide a WDM mixer-splitter having low insertion losses.

It is another object of the invention to provide a WDM mixer-splitter with reduced cross-talk between channels.

It is yet another object of the invention to provide a WDM mixer-splitter with reduced reflection losses.

It is a further object of the invention to provide a WDM mixer-splitter which may be facilely and economically manufactured.

It is yet a further object of the invention to provide a WDM mixer-splitter which may be facilely mass produced for multiple wavelength tapping or multiplexing.

THE DRAWINGS

Other objects and advantages of the present invention will become apparent from the following detailed description of a preferred embodiment thereof taken in conjunction with the accompanying drawings, wherein.

DETAILED DESCRIPTION

Figure 1:
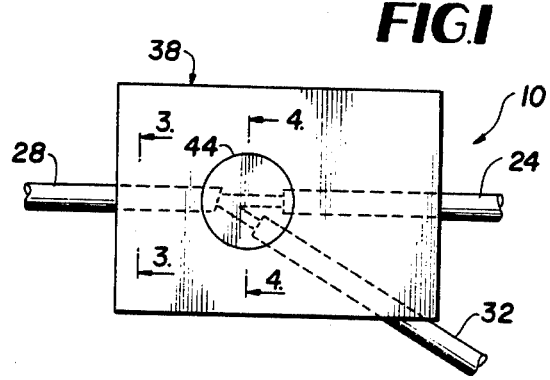
FIG. 1 is a plan view of a WDM mixer-splitter in accordance with a preferred embodiment of the invention for two wavelengths.
Figure 2:
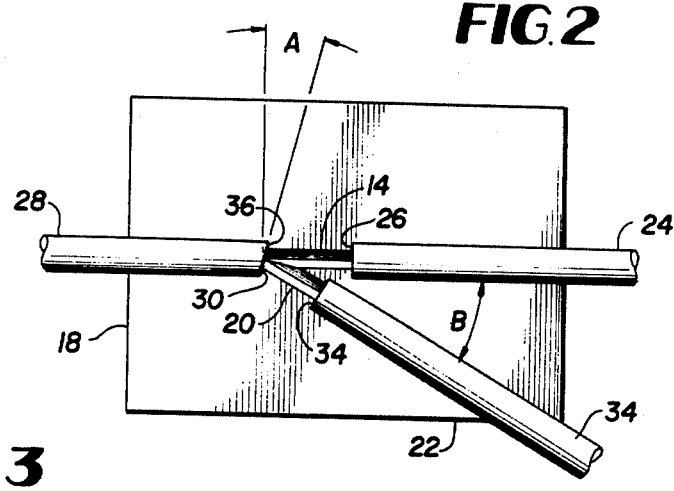
FIG. 2 is a plan view of the WDM mixer-splitter disclosed in FIG. 1 with an upper cover plate removed.

Referring now to the drawings and particularly to FIGS. 1 and 2 thereof, there will be seen a WDM mixer-splitter 10 in accordance with a preferred embodiment of the invention. More specifically, the unit comprises a substrate chip or substantially flat wafer 12 having a first groove 14 sectioned within the upper surface thereof in a straight line from one side 16 of the wafer to the other side 18. The wafer is further fabricated with a second groove 20 which extends in a straight line a third edge portion 22 of the wafer to a position intersecting the first groove approximately in the center of the substrate chip.

Figures 3, 4:
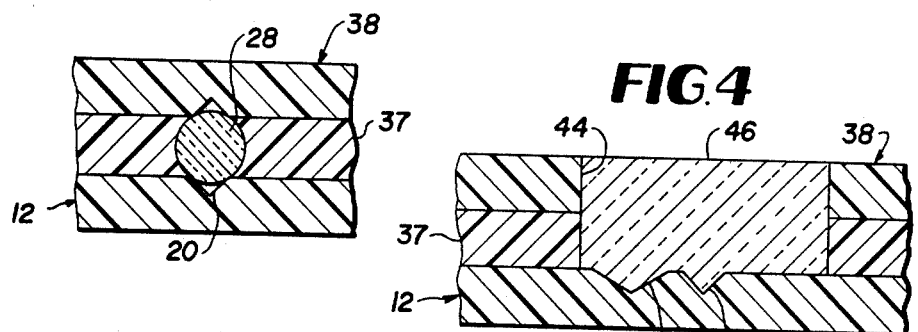
FIG. 3 is a cross-sectional view taken along section line 3—3 in FIG. 1 and discloses an optical fiber held between aligning grooves in a substrate chip and a cover member.
FIG. 4 is a cross-sectional view taken along section line 4—4 in FIG. 1 and discloses use of an index matching fluid between fiber end faces to reduce reflection losses and cross-talk.

The substrate chip is precision molded from an accurately prepared dye and is preferably composed of a thermoplastic material. The substrate chip grooves can be fashioned with various cross-sectional configurations such as semi-circular, square, rectangular, trapezoidal, or other configurations, but is preferably formed in a V-shaped configuration such as depicted in FIGS 2 and 3 of the drawings.

A first input/output optical fiber 24 is laid at least partially within and thus aligned by one end of the groove 14. This first optical fiber terminates in a position as at 26 adjacent the intersection of the second groove 20 with the first groove 14. A second optical fiber 28 is laid at least partially within the other end of groove 14 and terminates in a position 30 adjacent to the intersection of groove 20 with groove 14 and in a posture of mutually opposing coaxial alignment with the end of the first optical fiber 24. A third optical fiber 32 is at least partially laid within and thus aligned by groove 20 and in a manner similar to the first and second optical fibers terminates at a location 34 in a position adjacent the intersection of the first and second grooves within the substrate chip.

Optical fibers per se are well known in the art and the grooves within the substrate chip permit the use of a wide variety of fiber-types and diameters, however, a circular optical fiber is preferred. The second optical fiber 28 is terminated at an angle A with respect to a line drawn perpendicular to a central longitudinal axis of the fiber and is optically directed toward the terminating ends of both the first and third input/output optical fibers 24 and 32. The terminating end of optical fiber 28 is coated with an optical composition 36 which varies depending upon the application intended for the unit. More particularly, if the unit application is intended to be a mixer-splitter a dichroic filter-type coating, known in the art, is applied directly to the end face. Alternatively, a reflective mirror-type coating may be applied for general power tapping applications or an anti-reflection coating may be used to reduce insertion losses.

The angle B of the groove 20 with respect to the first groove 14, and thus the angle of a central longitudinal axis of the input/output fiber 32 with respect to a central longitudinal axis of the input/output fiber 24, may cover a range of several degrees to ninety degrees depending upon the intended application. In this regard, when a dichroic filter coating is applied to terminating face 36 the angle B is preferably 15 to 20 degrees to take advantage of the sharp cut-off characteristics of the filter. When the end face 36 carries a partially reflective coating for selective optical power tapping, the angle B is typically 90 degrees to minimize cross-talk. Regardless of the angle selected for angle B, angle A is selected to be one-half of the angle B so as to be in optical alignment with the terminating ends of both optical fiber 24 and 32.

In addition the terminating ends 26 and 34 of the first and third optical fibers may be fashioned with integral coatings in a manner similar to coating 36. These coatings may be dichroic, partially reflective, anti-reflective or no coating at all depending upon the application intended for the unit. Still further the end faces 26 and 34 may be non-perpendicular to reduce feedback reflection into the input/output fibers 24 and 32. The spacing or gap between the fiber end faces is preferably held to a minimum to reduce insertion losses.

Once in place, the optical fibers may be bonded to the substrate chip by an epoxy layer 37 (note FIG. 3) in order to unitize the assembly for subsequent application. Additionally, a cover 38 may be fabricated to be dimensionally compatible with the substrate chip including the provision of mirror image crossing and intersecting grooves. Upon placing of the optical fibers within the substrate grooves, the cover 38 is applied to the unit and epoxy-welded in place. A central tapping aperature 44 is fashioned within the cover 38 in a position of alignment with the inner structure of substrate grooves 14 and 20. By the provision of this access aperature, the spacing between the optical fibers may be filled with an epoxy cement or index matching fluid 46 as desired.

Figure 5:
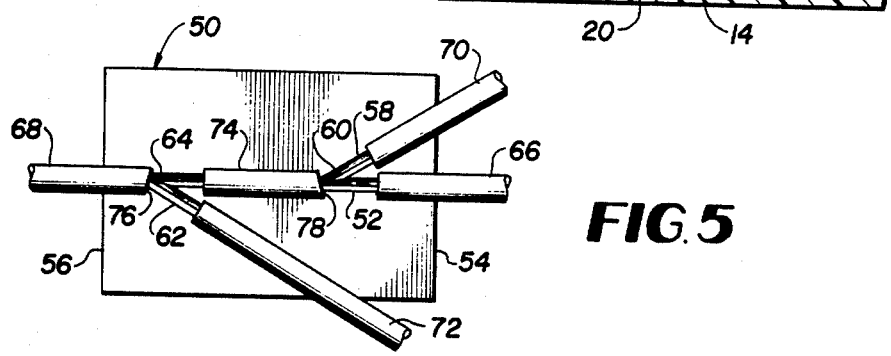
FIG. 5 is a plan view of a WDM mixer-splitter in accordance with an alternate preferred embodiment of the invention for three wavelengths.

As previously mentioned in the drawings portion of the application, FIGS. 1 and 2 depict a basic two wavelength WDM mixer-splitter or an optical tap with one input/output when angle B equals 90 degrees. FIG. 5 depicts a variation of the two wavelength unit and specifically provides for a three wavelength unit which may be multiplied further by appropriate duplication of elements.

More specifically, FIG. 5 entails a substrate chip or substantially flat wafer 50 having a first groove 52 extending from one edge 54 of the chip to another edge 56 thereof. A second groove 58 is fashioned in a straight line upon the substrate chip and intersects the first groove as to 60. At least a third groove 62 is also fashioned upon the upper surface of the substrate chip 50 and intersects a downstream portion of the first groove 50 as at 64.

As previously noted, optical fibers are designed to at least partially lay within and thus be aligned by the grooves formed within the substrate chip. More specifically, a first, input/output, fiber 66 lays within a first end portion of the groove 52. A second, output/input, optical fiber 68 extends within the other end of groove 52 and is in coaxial and mutually facing alignment with the first optical fiber. A third input/output optical fiber 70 is aligned upon the substrate chip 50 by groove 58 and at least a fourth, input/output, optical fiber 72 is aligned upon the substrate chip 50 by groove 62.

At least a fifth optical fiber segment 74 is aligned upon the first groove 52 in a posture intermediate the terminating ends of the first and second optical fibers.

In a manner similar to the WDM mixer-splitter depicted in FIGS. 1 and 2 the end faces 76 and 78 of the second and at least a fifth optical fibers are formed at an angle and in optical alignment with the at least fourth and at least fifth and the first and third optical fibers respectively. The end faces 76 and 78 may be coated with an optical composition such as a dichroic filter composition, or reflective coating depending upon the application intended as previously discussed. Moreover, the multi-wavelength unit depicted in FIG. 5 may be provided with a strengthening and protective cover, not shown, in a manner discussed in connection with the two wavelength unit depicted in FIG. 1.

The insertion loss for the subject WDM mixer-splitter or tap depends basically on how the device is used, the size and reflective index profile of the optical fibers, and the spacing between the fiber end faces. The expected accuracy of the grooves is about 0.9 micrometers. The fibers used for the subject invention should be selected to have the smallest size variation of outside diameters as possible. Fibers are available with diameter variations of less than 0.3 micrometers. The larger the diameter of the fiber used the lower the expected insertion loss for fiber misalignments. Thus, large diameter fibers are preferable.

The fiber segments protruding from the substrate chip can be directly attached to small area light sources or detectors, spliced to other fibers or terminated with connectors or attached to other end devices or couplers. If necessary, the fiber segment outside the substrate can be tapered to match the cross-sectional area of a smaller connecting fiber or cable.

The subject unit when used as a tap is suitable for use with light emitting diode and laser emission sources. As a WDM mixer-splitter the best results are achieved with laser sources since such sources have very narrow spectural widths. Light emitting diodes with suitable spaced emission wavelengths can also be used. For example, a low cross-talk WDM system using the subject low insertion loss device may advantageously use emission wavelengths of 0.80, 1.06 and 1.32 microns.

The above descriptions and techniques are quite suitable to produce a low insertion loss, low cross-talk optical multiplexer for applications in telecommunications, computer networks, and numerous fiber optic communications applications.

In describing the invention, reference has been made to preferred embodiments. Those skilled in the art, however, and familiar with the disclosure of the subject invention, may recognize additions, deletions, modifications, substitutions and/or other changes which will fall within the purview of the subject invention.

What is claimed is:

1. An optical wavelength division multiplexer-splitter comprising:
   a substrate chip comprising a substantially flat wafer member having,
      a first groove fashioned with an upper surface of said wafer and extending in a straight line across the wafer from one edge to another edge thereof, and
      a second groove fashioned within the upper surface of said wafer and extending in a straight line from a third edge position thereof to a point intersecting said first groove at a generally central portion of said wafer;
   first optical fiber means for conducting light waves aligned upon and extending at least partially within said first groove from said one edge of said wafer and terminating in a position adjacent the intersection of said second groove with said first groove;
   second optical fiber means for conducting light waves aligned upon and extending at least partially within said first groove and from said another edge of said wafer and terminating in a position adjacent the intersection of said second groove with said first groove and generally opposed to the terminating end of said first optical fiber means, the terminating end of said second optical fiber means being finished with a face at an angle relative to a central longitudinal axis of said second optical fiber means and the magnitude of the angle of said face with respect to a line drawn perpendicular to the central longitudinal axis of said second optical fiber means being approximately one half the magnitude of the angle formed between the central longitudinal axes of said first and third optical fiber means;
   third optical fiber means for conducting light waves aligned upon and extending at least partially within said second groove and terminating in a position adjacent the intersection of said second groove with said first groove;
   optical coating means applied directly upon the face of said second optical fiber means; and
   means for mounting said first and second and said third optical fiber means at least partially within said first and second grooves respectively.

2. An optical wavelength division multiplexer-splitter as defined in claim 1 wherein:
   the intersection of said second groove with said first groove, and accordingly the central longitudinal axis of said first optical fiber means with respect to the central longitudinal axis of said third optical fiber means, forms an acute angle.

3. An optical wavelength division multiplexer-splitter as defined in claim 2 wherein:
   said acute angle between the central longitudinal axes of said first and third optical fiber means comprises 15 to 20 degrees.

4. An optical wavelength division multiplexer-splitter as defined in claim 2 wherein:
   said optical coating comprises a dichroic filter composition.

5. An optical wavelength division multiplexer-splitter as defined in claim 1 wherein:
   the intersection of said second groove with said first groove, and accordingly the central longitudinal axis of said first optical fiber means with respect to the central longitudinal axis of said third optical fiber means, forms an angle of approximately 90 degrees.

6. An optical wavelength division multiplexer-splitter as defined in claim 5 wherein:
   said optical coating comprises a partially reflective composition for selective optical power tapping.

7. An optical wavelength division multiplexer-splitter as defined in claim 1 wherein:
   terminating end faces of each of said first and third optical fiber means lie at an angle with respect to the central longitudinal axis of each respective optical fiber.

8. An optical wavelength division multiplexer-splitter as defined in claim 1 wherein:
   an optical coating is applied directly to the terminating end faces of said first and third optical fiber means.

9. An optical wavelength division multiplexer-splitter as defined in claim 8 wherein:
   said optical coating on the terminating end faces of said first and third optical fiber means comprises a dichroic filter composition.

10. An optical wavelength division multiplexer-splitter as defined in claim 8 wherein:
    said optical coating on the terminating end faces of said first and third optical fiber means comprises a partially reflective composition.

11. An optical wavelength division multiplexer-splitter as defined in claim 8 wherein:
    said optical coating on the terminating end faces of said first and third optical fiber means comprises an anti-reflective composition.

12. An optical wavelength division multiplexer-splitter as defined in claim 1 wherein:
    each of said first and second grooves fashioned within an upper surface of said wafer has a V-shaped cross-section.

13. An optical wavelength division multiplexer-splitter as defined in claim 1 wherein said means for mounting comprises:
    an epoxy binder which couples said first, second and third optical fiber means to said substrate chip.

14. An optical wavelength division multiplexer-splitter as defined in claim 1 wherein said means for mounting comprises:
    a cover chip dimensionally compatible with sad substrate chip and having grooves therein to receive at least a portion of said first, second and third optical fiber means; and
    means for mounting said cover chip on top of said substrate chip.

15. An optical wavelength division multiplexer-splitter as defined in claim 14 wherein:

said cover chip is fashioned with at least one aperature above the intersection of said second groove with said first groove; and an intex matching fluid is injected through said aperature and fills the volume existent among the terminating ends of said first, second and third optical fiber means.

16. An optical multi-wavelength division multiplexer-splitter comprising:

a substrate chip comprising a substantially flat wafer member having, a first groove fashioned within an upper surface of said wafer and extending in a straight line across the wafer from one edge to another edge thereof, a second groove fashioned within the upper surface of said wafer and extending in a straight line from a third edge position of said wafer to a first point intersecting said first groove;

at least a third groove fashioned within the upper surface of said wafer and extending in a straight line from at least a fourth edge position of said wafer to at least a second point intersecting said first groove;

first optical fiber means for conducting light waves aligned upon and extending at least partially within said first groove from said one edge of said wafer and terminating in a position adjacent to said first point;

second optical fiber means for conducting light waves aligned upon and extending at least partially within said first groove from said another edge of said wafer and terminating in a position adjacent said at least a second point;

third optical fiber means for conducting light waves aligned upon and extending at least partially within said second groove from a third edge position of said wafer and terminating in a position adjacent said first point;

at least a fourth optical fiber means for conducting light waves aligned upon and extending at least partially within said at least a third groove from at least a fourth edge position of said wafer and terminating in a position adjacent said at least a second point;

at least a fifth optical fiber means for conducting light waves aligned upon and extending at least partially within said first groove from a position adjacent said first point to a position adjacent said at least a second point;

a terminating end face of said second optical fiber means being finished at an angle with respect to a central longitudinal axis of said second optical fiber means and in optical alignment with said at least a fourth and said at least a fifth optical fiber means;

a terminating end face of said at least a fifth optical fiber means being finished at an angle with respect to a central longitudinal axis of said at least a fifth optical fiber means and in optical alignment with said first and third optical fiber means; and optical coating means applied direction upon the terminating end face of said second optical fiber means; and optical coating means applied directly upon the terminating end face of said at least a fifth optical fiber means; and means for mounting said first, second, third, at least a fourth and at least a fifth optical fiber means upon said substrate chip and at least partially within said grooves within said substrate chip.

17. An optical multi-wavelength division multiplexer-splitter as defined in claim 16 wherein:

the intersection of said second groove with said first groove and said at least a third groove with said first groove each forms an acute angle.

18. An optical multi-wavelength division multiplexer-splitter as defined in claim 17 wherein:

said optical coatings on said second and at least a fifth optical fiber means each comprise a dichroic filter composition.

19. An optical multi-wavelength division multiplexer-splitter as defined in claim 16 wherein:

the intersection of said second groove with said first groove and said at least a third groove with said first groove each forms an angle of approximately 90 degrees.

20. An optical multi-wavelength division multiplexer-splitter as defined in claim 19 wherein:

said optical coatings on said second and at least a fifth optical fiber means each comprise a partially reflective composition for selective optical power tapping.

* * * * *